United States Patent

Sakamoto

Patent Number: 5,225,972
Date of Patent: Jul. 6, 1993

[54] POWER SOURCE

[76] Inventor: Hiroshi Sakamoto, 6-388-3, Tsuboi, Kumamoto-shi, Kumamoto, Japan

[21] Appl. No.: 848,893

[22] Filed: Mar. 10, 1992

[30] Foreign Application Priority Data

Mar. 20, 1991 [JP] Japan .................. 3-130838

[51] Int. Cl.⁵ .............................. H02M 3/338
[52] U.S. Cl. ........................ 363/18; 363/22; 331/112; 331/113 R
[58] Field of Search ............... 363/18, 19, 22, 23, 363/131, 143; 323/299; 320/21, 23; 336/DIG. 2; 331/112, 113 R

[56] References Cited

U.S. PATENT DOCUMENTS

| 3,938,018 | 2/1976 | Dahl ..................... 336/DIG. 2 |
| 4,422,032 | 12/1983 | Kakumoto .............. 320/39 |
| 4,496,896 | 1/1985 | Melocik et al. ........ 320/21 X |
| 4,757,433 | 7/1988 | Santelmann, Jr. ...... 363/19 |

FOREIGN PATENT DOCUMENTS 0195362  8/1991  Japan .
0207266  9/1991  Japan .

Primary Examiner—Emanuel T. Voeltz
Attorney, Agent, or Firm—Armstrong, Westerman, Hattori, McLeland & Naughton

[57] ABSTRACT

A power source driving an electrical device includes a DC power supply providing a rectified and smoothed DC voltage from an AC main power, a self-oscillator energized by the DC power supply to generate a high frequency voltage, and a transformer which provides an output voltage from the high frequency voltage for driving a load circuit of the device. The characterizing feature of the power source resides in that the self-oscillator comprises a class C amplifier and includes a bias stabilizing circuit which provides a stabilized bias to the class C amplifier for assuring constant and optimum operation irrespective of possible variations in the supply voltage as well as load variations.

20 Claims, 3 Drawing Sheets

POWER SOURCE

BACKGROUND OF THE INVENTION

1. Field of the Invention

The present invention is directed to a power source providing output power through a compact high frequency transformer or coupling transformer, and more particularly, to a power source for energizing and/or charging hand-held electrical devices such as transmitters of remote controllers for television sets, video recorders or compact disk players, cordless telephones, portable cassette recorders incorporating a rechargeable battery, or for use as an auxiliary power source for a switching power supply.

2. Description of the Related Art

As a power source for hand-held electrical devices, there has been widely utilized an AC power adaptor which energizes and in most cases charges a rechargeable battery incorporated in the devices. The prior AC power adaptor utilizes a power transformer to convert the available fixed-frequency AC main voltage to a DC voltage. In order to make the adaptor compact it has been proposed to use a small-sized core and a thin wire for the power transformer in view that the product of the number of turns of the wire or winding and the cross-sectional area of the core depends on the frequency and the voltage of the available AC main power. Nevertheless, this scheme has been found effective only to a limited extent in compacting the adaptor and has limited reliability. Further, the use of the power transformer inevitably brings about undesired power loss of about 1 Watt due to the core loss of the power transformer. To avoid these problems, there has been proposed a power adaptor of inverter-type which comprises a rectifier providing a DC voltage from the AC main power, an inverter converting the resulting DC voltage to an AC voltage, and an AC-to-DC converter providing a DC voltage for energization of the device. Although the inverter-type power adaptor is effective to considerably reduce the size of a transformer and therefore successfully down-size the power adaptor, there remains a problem that it necessitates a rather complex circuit for controlling a switching element or elements of the inverter and therefore makes the design very costly. In addition, the inverter-type power adaptor requires a relatively great power for controlling the inverter and suffers from a power loss of about 1 Watt due to the switching loss of the inverter, which renders the inverter-type power adaptor less advantageous in view of the power consumption.

SUMMARY OF THE INVENTION

The present invention eliminates the above problems and insufficiencies and provides an improved power source for driving an electrical device. The improved power source, in accordance with the present invention, includes a DC power supply providing a rectified and smoothed DC voltage from an AC main power source, a self-oscillator energized by the DC power supply to generate a high frequency voltage, and a transformer which transforms the resulting high frequency voltage into an output voltage for driving a load circuit of the device. The characterizing feature of the power source resides in that the self-oscillator comprises a class C amplifier and includes a bias stabilizing circuit which provides a stabilized bias to the class C amplifier for ensuring constant class C operation at optimum efficiency. With the use of the self-oscillator comprising the class C amplifier for generation of the high frequency voltage, the self-oscillator can be readily controlled simply by providing a bias voltage so that the oscillator can be simplified in circuit configuration and made less costly. Further, with the provision of the bias stabilizing circuit, it is possible to constantly operate the class C amplifier at an optimum efficiency to thereby assure reliable operation substantially independently of possible variations in the supply voltage as well as load variations.

Accordingly, it is a primary object of the present invention to provide an improved power source which is simple in circuit configuration and is made economical, yet assuring reliable operation.

Preferably, a monitoring circuit is included to monitor one of an output of the self-oscillator and a load current flowing through the load circuit. The monitoring circuit is connected to an output control circuit which varies the bias voltage of the self-oscillator in accordance with the monitored condition of the output voltage or the load current. It is therefore possible to provide a stabilized output as well as to effect over-current protection, which is therefore another object of the present invention.

In a preferred embodiment, a primary winding and a load winding of the transformer are detachably coupled electromagnetically as well as physically. The primary winding is disposed within a main housing together with the self-oscillator, while the load winding is included in the circuit of the device. The device is detachable from the main housing such that the load winding is electromagnetically coupled to the primary winding when the device is attached to the main housing. This arrangement enables a non-contact voltage supply to the device without requiring contact terminals and is therefore free from otherwise occurring inferior contact between the terminals, thereby enhancing reliability of supply of the voltage to the device. This is particularly advantageous when the power source is utilized as a power adaptor for charging the device incorporating a rechargeable or secondary battery such as Ni-Cd battery requiring frequent recharging. To this end, the load circuit includes a charge circuit which rectifies the AC voltage generated at the load winding to provide a corresponding DC voltage for charging the secondary battery incorporated in the device.

It is therefore a further object of the present invention to provide an improved power source which is particularly suitable for an AC power adaptor for charging the battery-operated device.

Further, the power source of the present invention may include a variable impedance element connected to the load winding included in the device for effecting a controlled charging by varying the impedance. Thus, it is readily possible to change on the side of the device for selecting the charge conditions such as rapid charge, normal charge, and a trickle charge.

It is therefore a still further object of the present invention to provide an improved power source which is capable of selecting the charge conditions on the side of the device.

These and still further objects and advantageous features of the present invention will become more apparent from the following description of the embodiments when taken in conjunction with the attached drawings.

DETAILED DESCRIPTION OF THE EMBODIMENTS

Figure 1:
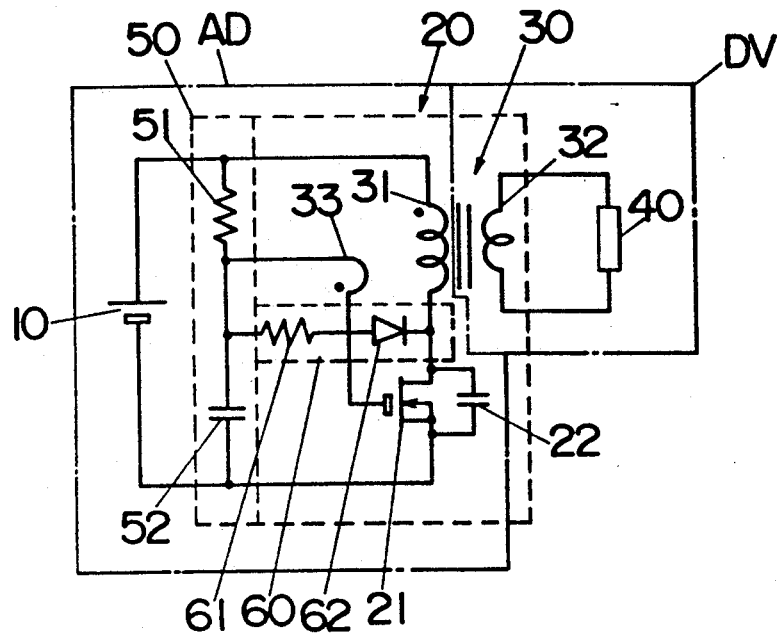
FIG. 1 is a circuit diagram of a power source in accordance with a first embodiment of the present invention.

Referring now to FIG. 1, there is shown a power source in accordance with a first embodiment of the present invention. The power source comprises a DC supply 10 providing a DC voltage which is rectified and smoothed by a suitable AC-to-DC converter (not shown) of known configuration from the available fixed-frequency (i.e., 50 or 60 Hz) AC main power (also not shown). Coupled to the DC supply 10 is a self-oscillator 20 which includes a high frequency transformer 30 to convert the DC voltage supplied from the DC supply 10 into a high frequency AC voltage. The resulting high frequency AC voltage is applied to a load 40 for energization thereof. The load 40 is incorporated in a DC-operated device and includes a rechargeable battery such as Ni-Cd battery (not shown) and a charging circuit (also not shown) thereof. To this end, the load 40 comprises a rectifier (not shown) providing a DC voltage from the high frequency voltage being supplied from the self-oscillator 20 in order to energize the device and/or charge the battery. In this sense, the power source of the present invention serves as an AC power adaptor for the DC-operated device including the rechargeable battery.

The self-oscillator 20 comprises, in addition to the transformer 30 with a primary winding 31, a load winding 32 and a feedback winding 33, a transistor amplifier 21 made of, for example, an FET, a bias circuit 50 composed of a resistor 51 and a capacitor 52, a bias stabilizing circuit 60 of a resistor 61 and a diode 62, and a resonance-inducing capacitor 22. The self-oscillator 20 is operated as a class C amplifier. To this end, the transistor amplifier 21 is connected in the circuit in such a manner that the DC voltage from the DC supply 10 is applied through the primary winding 31 across the transistor amplifier 21 and that a bias voltage generated from the bias circuit 50 and the bias stabilizing circuit 60 is applied to a control terminal of the transistor amplifier 21 in a superimposed relation to a positive feedback signal generated at the feedback winding 33 of the transformer 30 and applied to the control terminal. A resonance frequency of the self-oscillator 20 is determined by inductance of the primary winding 31, parasitic capacitance of the transistor amplifier 21, winding capacitance of the transformer 30, and capacitance of the resonance inducing capacitor 22. Although the resonance inducing capacitor 22 is connected across the transistor amplifier 21 in this embodiment, it may be connected in parallel with the primary winding 31. When the transistor amplifier 21 is selected to have a sufficiently great capacitance for determination of a desired resonance frequency, the resonance inducing capacitor 22 may be omitted.

The load winding 32 is disposed together with the load 4 within a casing of the device DV which is made detachable to an adaptor housing A incorporating the other components of the self-oscillator 20, the bias circuit 50, and the bias stabilizing circuit 60 so that, when the device DV is attached to the adaptor housing A, the load winding 32 is electromagnetically coupled to the primary winding 31 for generation of the AC voltage at the load winding 32, which AC voltage is then rectified to energize the device DV and/or charge the rechargeable battery. For this purpose, the load 40 includes a rectifier and a charge circuit, although not shown in the figure.

Figure 2:
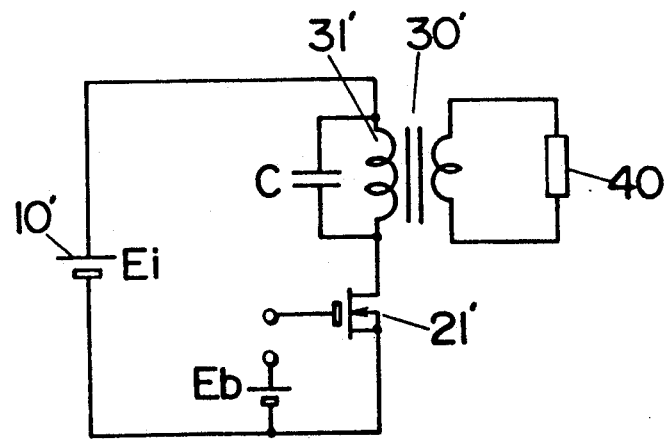
FIG. 2 is a schematic circuit diagram of a general amplifier.
Figure 3A:
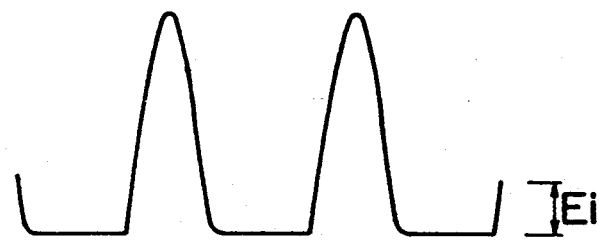
FIG. 3A is a waveform chart showing a voltage applied across a switching transistor in the amplifier of FIG. 2 when operated as a class A amplifier.

Operation of the power source will be now discussed. Prior to discussing the operation of the power source of the present invention, an explanation is initially made to a general amplifier circuit of FIG. 2 supplied with a bias voltage Eb. When the amplifier circuit of FIG. 2 is driven in class A operation, it is required to set a bias voltage for linear operation of a transistor amplifier 21'. With this linear operation, however, there arises a considerable power loss which renders the circuit ineffective for use as a power source. To avoid this problem, it has been contemplated to input a square wave signal to the transistor amplifier 21' with a suitable amplification factor to effect switching operation of the transistor amplifier 21'. As a result, the switching operation can reduce the power loss at the turn-on of the transistor amplifier 21', the resulting in wide use of the circuit with this switching operation as an effective power source. Nevertheless, there still remains a problem in this circuit that a surge current will flow at the time of turning on the transistor amplifier 21' due to the presence of parasitic capacitance in a high frequency transformer 30', as well as in the transistor amplifier 21', and also that there appears a considerable large surge voltage (several times of DC supply voltage Ei), as shown in FIG. 3A, at the time of turning off the transistor amplifier 21'. Although, the power loss due to the surge current will cause no substantial influence when the circuit is designed to produce a relatively large output power, it becomes critical when the circuit is limited to produce a small output power on the order of hundreds of milliwatts, since it greatly lowers efficiency.

Figure 3B:
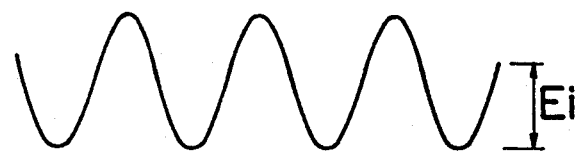
FIG. 3B is a waveform chart showing a voltage applied across the switching transistor in the amplifier of FIG. 2 when operated as a class C amplifier.

In contrast, when the circuit is driven in class C operation by suitably selecting inductance L of a primary winding 31', equivalent capacitance C connected in parallel with the primary winding 31' and composed of capacitance of the transistor amplifier 21' and winding capacitance of the transformer 30' to determine a resonance frequency which is equal to an input frequency and also by driving to turn on the transistor amplifier 21' for a very limited time interval within a period of resonance cycle, the resulting voltage developed across the transistor amplifier 21' takes the form of nearly a sinusoidal wave, as shown in FIG. 3B, and has a reduced peak value of only about twice the DC supply voltage Ei. With this class C operation, the equivalent capacitance C connected in parallel with the inductance L of the primary winding 31' can be charged and discharged due to the resonance, thereby enabling a remarkably minimal power loss. That is, the transistor amplifier 21' can be kept turned off over a long time interval within one cycle period of the resonance and can be turned on only for a limited short time interval where the terminal voltage is near zero voltage, thereby presenting nearly 100% power efficiency.

Turning again to FIG. 1, the power source of the present invention is configured to realize the self-oscillator 20 with a simple circuit configuration in which the self-oscillator 20 is driven by a signal excited at the feedback winding 33 and class C operation is achieved by the bias circuit 50 composed of resistor 51 and capacitor 52. Only with the addition of the bias stabilizing circuit 60 of resistor 61 and diode 62 can the class C operation can be continued at an optimum efficiency. When the circuit is energized or connected to the AC main power, the DC supply 10 generates the DC voltage to Charge the capacitor 52 through the resistor 51. Upon the capacitor 52 being charged to have its terminal voltage increased up to a threshold level of a control terminal of the transistor amplifier 21, the transistor amplifier 1 is made conductive to effect positive feedback from the feedback winding 33, thereby initiating the self-excited oscillation. If the terminal voltage of the capacitor 52 (i.e., bias voltage of the transistor amplifier 21) is kept fixed to the threshold level, the transistor amplifier 21 would be made conductive for over one-half of the resonance cycle period, resulting in an unduly increased power loss. To avoid this problem, the bias stabilizing circuit 60 is included such that the capacitor 52 is discharged through diode 62 and resistor 61 when the terminal voltage of the transistor amplifier 21 is less than that of the capacitor 52 to render the transistor amplifier 21 nearly conductive. Thus, the terminal voltage (bias voltage) of the capacitor 52 can be made lower than the threshold voltage of the transistor amplifier 21 to thereby shorten the on-time interval of the transistor amplifier 21. As the on-time interval is shortened, the capacitor 52 discharges a correspondingly reduced current to increase the terminal voltage of the capacitor 52, thereby effecting a negative feedback in a direction of stabilizing the bias voltage. By suitably selecting the resistances of the resistors 51 and 61, the bias voltage can be easily set to a suitable value such that the transistor amplifier 21 is made conductive only for a limited short time interval within one resonance cycle during which the voltage across the transistor amplifier 21 is nearly zero. Consequently, it is made possible to constantly effect the self-excited oscillation at an optimum efficiency irrespective of possible voltage variations in the DC supply 10 or AC main power, load Variations resulting from varying gaps possible present between the primary winding 31 and the load winding 32, thereby reducing the power loss to a minimum.

As apparent from the above discussion, the power supply of the present invention can provide an output voltage which is stable against possible variations in the supply voltage and the load variations, particularly due to the gap variations in the electromagnetic coupling between the primary winding 31 and the load winding 32. Therefore, it is most effective when utilized as an AC power adaptor for energizing and charging the device DV which is made detachable physically and electromagnetically to the adaptor housing AD (or charger unit) incorporating the circuit components forming the self-oscillator 20 but excluding the load 40, the load winding 32, and a core of the transformer 30. That is, the device DV is made to incorporate the load winding 32 and the core in addition to the load 4 and its associated circuitry such that the load winding 32 is electromagnetically coupled to the primary winding 31 when the device DV is attached to the adaptor housing AD or charger unit. Although such detachable structure is likely to suffer varying gap distances between the primary winding 31 and the load winding 32 during the repeated use of the device DV, the above circuit can effect charging free from the gap variations and therefore can provide an effective an reliable power source for charging the devices such as transmitters of remote controllers for televisions sets or video recorders, compact disk players, cordless telephones, cassette recorders, and the like, or for providing an auxiliary power supply for use in a switching power supply.

Figure 4:
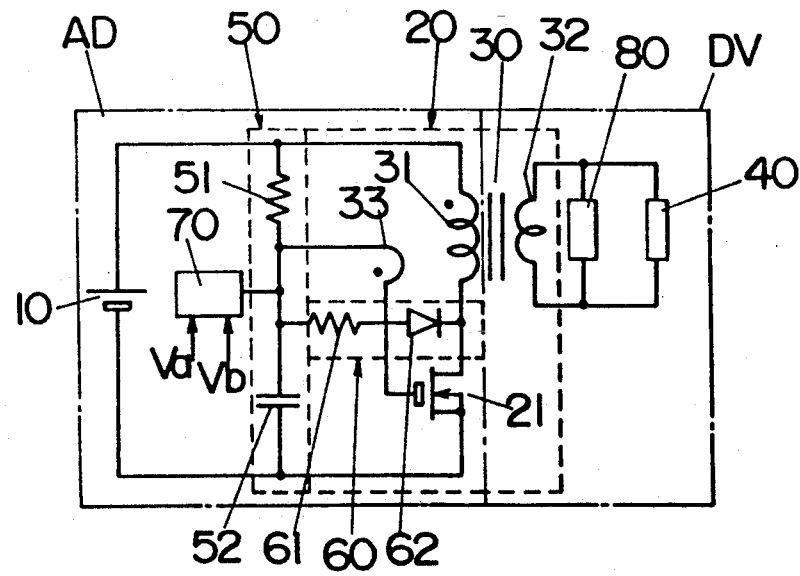
FIG. 4 is a circuit diagram of a power source in accordance with a second embodiment of the present invention.

FIG. 4 illustrates a power source in accordance with a second embodiment of the present invention which is identical to the first embodiment but additionally includes an output control circuit 70 for controlling the bias voltage based upon the output voltage applied to the load 40 or a load current and also a charge control circuit 80 with a variable impedance element connected in parallel with the load winding 32. The output control circuit 70 is connected in circuit between the resistor 51 and the capacitor 52 to vary a current flowing through the capacitor 52 based upon control signals Va and Vb input to the output control circuit 70, thereby controlling charging of the capacitor 52 and therefore the on-time duration of the transistor amplifier 21. The discharge of the capacitor 52 is made through the resistor 61 and the diode 62 also in this circuit. The control signals Va and Vb are provided in the form of negative feedback signals indicative of the output voltage being applied to the load 40 and the load currents, respectively so as to provide a stabilized output voltage to the load 40 as well as to provide overcurrent protection.

The impedance element of the charge control circuit 80 is a variable has impedance element of which impedance can be selected on the side of the device so as to control the self-oscillator 20 of the charger unit AD. When the impedance is set to a relatively high level, the self-oscillator 20 is kept operated to effect a normal oscillation. When the impedance is set to a relatively low level to be substantially short-circuited, the feedback winding 33 excites only a low level feedback signal to thereby cease the oscillation at the self-oscillator 20. In view of that the self-oscillator 20 comprises the class C amplifier having the transistor amplifier 21 and the bias circuit 50 providing to the transistor amplifier 21 the bias voltage (terminal voltage of capacitor 52) lower than the threshold voltage of the transistor amplifier 21, once the oscillation is ceased, the oscillation will not resume until the capacitor 52 is charged through the resistor 51 to such a level that the terminal voltage reaches the threshold voltage. Consequently, by varying the impedance connected to the load winding 32, it is readily possible to vary the oscillation period of the self-oscillator 20 and therefore the output voltage or the load current, whereby enabling to control the charging of the rechargeable battery from within the device DV.

Figure 5:
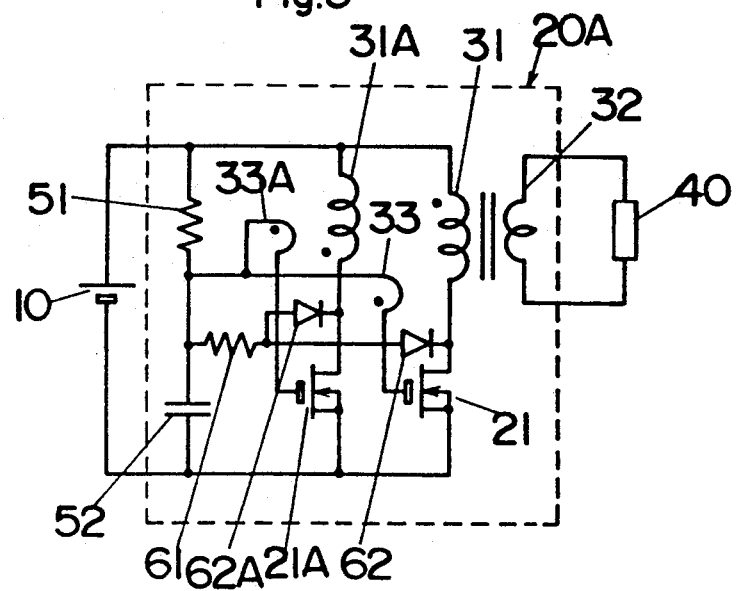
FIG. 5 is a circuit diagram of a power source in accordance with a third embodiment of the present invention.

FIG. 5 illustrates a power source in accordance with a third embodiment of the present invention which is identical in structure and operation to those of first embodiment except that an extra set of primary winding 31A, feedback winding 33A, transistor amplifier 21A and diode 62A is added to form a push-pull self-oscillator 20A.

Figure 6:
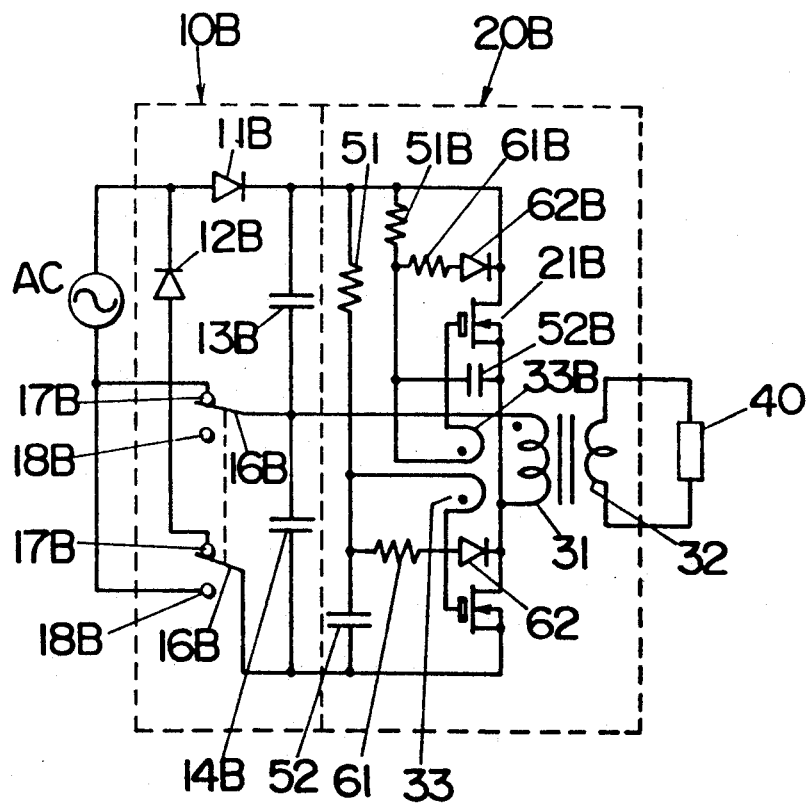
FIG. 6 is a circuit diagram of a power source in accordance with a fourth embodiment of the present invention.

FIG. 6 illustrates a power source in accordance with a fourth embodiment of the present invention which is identical in structure and operation to those of the first embodiment except that it is specifically designed to operate selectively on different voltage of available AC main power, for example, 100 or 200 volts. To this end, the DC supply 10B comprises diodes 11B and 12B, capacitors 13B and 14B, and a power select switch with change-over contacts 16B. Further, the power source is arranged to provide a self-oscillator 20B of bridge configuration which comprising an extra set of transistor amplifier 21B, feedback winding 33B, resistors 51B and 61B, capacitor 52B and diode 62B such that circuit is driven by the AC main power of high voltage, for example, 200 volts when the power select switch is operated to turn the change-over contacts 16B into conduction with corresponding contacts 17B, and it is driven by the AC main power of low voltage, for example, 100 volts when the power select switch is operated to turn the change-over contacts 16B into conduction with corresponding contacts 18B.

What is claimed is:

1. A power source for driving an electrical device comprising:
   a DC supply providing a rectified and smoothed DC voltage from an AC power supply;
   a self-excited oscillator comprising an FET transistor energized by said DC power supply to generate a high frequency voltage; and
   a transformer providing an output AC voltage to a load circuit of said device from said high frequency voltage,
   wherein said self-excited oscillator comprises a Class-C amplifier and includes a bias stabilizing circuit comprising a diode and a resistor connected in series between a first end of a feedback winding of said transformer and a drain terminal of said FET transistor, wherein a second end of said feedback winding is connected to a gate terminal of said FET transistor, wherein said bias stabilizing circuit provides a stabilized bias to said Class-C amplifier for assuring constant Class-C operation at an optimum efficiency.

2. A power source as recited in claim 1, including means for monitoring one of an output voltage of said self-excited oscillator and a load current flowing through said load circuit to produce a monitored condition, and an output control circuit for varying said bias in accordance with said monitored condition of said output voltage or said load current.

3. A power source as set forth in claim 1, wherein said transformer includes a primary winding and a load winding electromagnetically and physically detachable from said primary winding, said primary winding disposed within a main housing together with said self-oscillator and said load winding included in said load circuit of said device, said device being detachable from said main housing such that said load winding is electromagnetically coupled to said primary winding when said device is attached to said main housing.

4. A power source as set forth in claim 3, wherein said load circuit includes a charge circuit which rectifies said lowered AC voltage generated at said load winding to provide a corresponding DC voltage for charging a secondary battery such as Ni-Cd battery incorporated in said device.

5. A power source as set forth in claim 4, including impedance means for controlling to vary an impedance connected to said load winding for changing charging conditions.

6. A power source as recited in claim 1, wherein said bias stabilization circuit further includes a capacitor for providing a stabilize bias voltage to said Class-C amplifier.

7. A power source for driving an electrical device, comprising:
   a DC power supply providing a rectified and smoothed DC voltage from an AC power source;
   a self-excited oscillator energized by said DC power supply to generate a high frequency voltage; and
   a transformer providing an output AC voltage to a load circuit of said device from said high frequency voltage,
   wherein said self-excited oscillator comprises a Class-C amplifier and includes a capacitor providing a bias voltage in a bias stabilizing circuit, which provides a stabilized bias to said Class-C amplifier for assuring constant Class-C operation at an optimum efficiency.

8. A power source as recited in claim 7, including means for monitoring one of an output voltage of said self-excited oscillator and a load current flowing through said load circuit to produce a monitored condition, and an output control circuit for varying said bias in accordance with said monitored condition of said output voltage or said load current.

9. A power source as set forth in claim 7, wherein said transformer includes a primary winding and a load winding electromagnetically and physically detachable from said primary winding, said primary winding disposed within a main housing together with said self-oscillator and said load winding included in said load circuit of said device, said device being detachable from said main housing such that said load winding is electromagnetically coupled to said primary winding when said device is attached to said main housing.

10. A power source as set forth in claim 9, wherein said load circuit includes a charge circuit which rectifies said lowered AC voltage generated at said load winding to provide a corresponding DC voltage for charging a secondary battery such as Ni-Cd battery incorporated in said device.

11. A power source as set forth in claim 10, including impedance meas for variably controlling an impedance connected to said load winding for changing charging conditions.

12. A power source for driving an electrical device, comprising:
   a DC power supply providing a rectified and smoothed DC voltage from an AC power source;
   a self-excited oscillator comprising an amplifier element energized by said DC power supply to generate a high frequency voltage; and
   a transformer providing an output AC voltage to a load circuit of said device from said high frequency voltage,
   wherein said self-excited oscillator comprises a Class-C amplifier and includes a bias stabilization circuit comprising a resistor and a diode connected in series between one end of a feedback winding of said transformer and an output end of said amplifier element in order to provide a stabilized bias voltage for Class-C amplification.

13. A power source as recited in claim 12, including means for monitoring one of an output voltage of said self-excited oscillator and a load current flowing through said load circuit to produce a monitored condition, and an output control circuit for varying said bias in accordance with said monitored condition of said output voltage or said load current.

14. A power source as set forth in claim 12, wherein said transformer includes a primary winding and a load winding electromagnetically and physically detachable from said primary winding, said primary winding disposed within a main housing together with said self-oscillator and said load winding included in said load circuit of said device, said device being detachable from said main housing such that said load winding is electromagnetically coupled to said primary winding when said device is attached to said main housing.

15. A power source as set forth in claim 14, wherein said load circuit includes a charge circuit which rectifies said lowered AC voltage generated at said load winding to provide a corresponding DC voltage for charging a secondary battery such as Ni-Cd battery incorporated in said device.

16. A power source as set forth in claim 15, including impedance means for variably controlling an impedance connected to said load winding for changing charging conditions.

17. A power source as recited in claim 12, wherein a second end of said feedback winding is connected to an input end of said amplifier element.

18. A power source as recited in claim 12, wherein said amplifier element comprises a transistor.

19. A power source as recited in claim 18, wherein said transistor consists of an FET transistor, and wherein said output end of said amplifier element consists of a drain terminal of said FET transistor.

20. A power source as recited in claim 19, wherein a second end of said feedback winding is connected to a gate terminal of said FET transistor.

* * * * *